June 16, 1925.  1,542,538
H. F. WILLKIE
PROCESS OF PURIFYING ACETONE
Filed Nov. 4, 1921   2 Sheets-Sheet 1
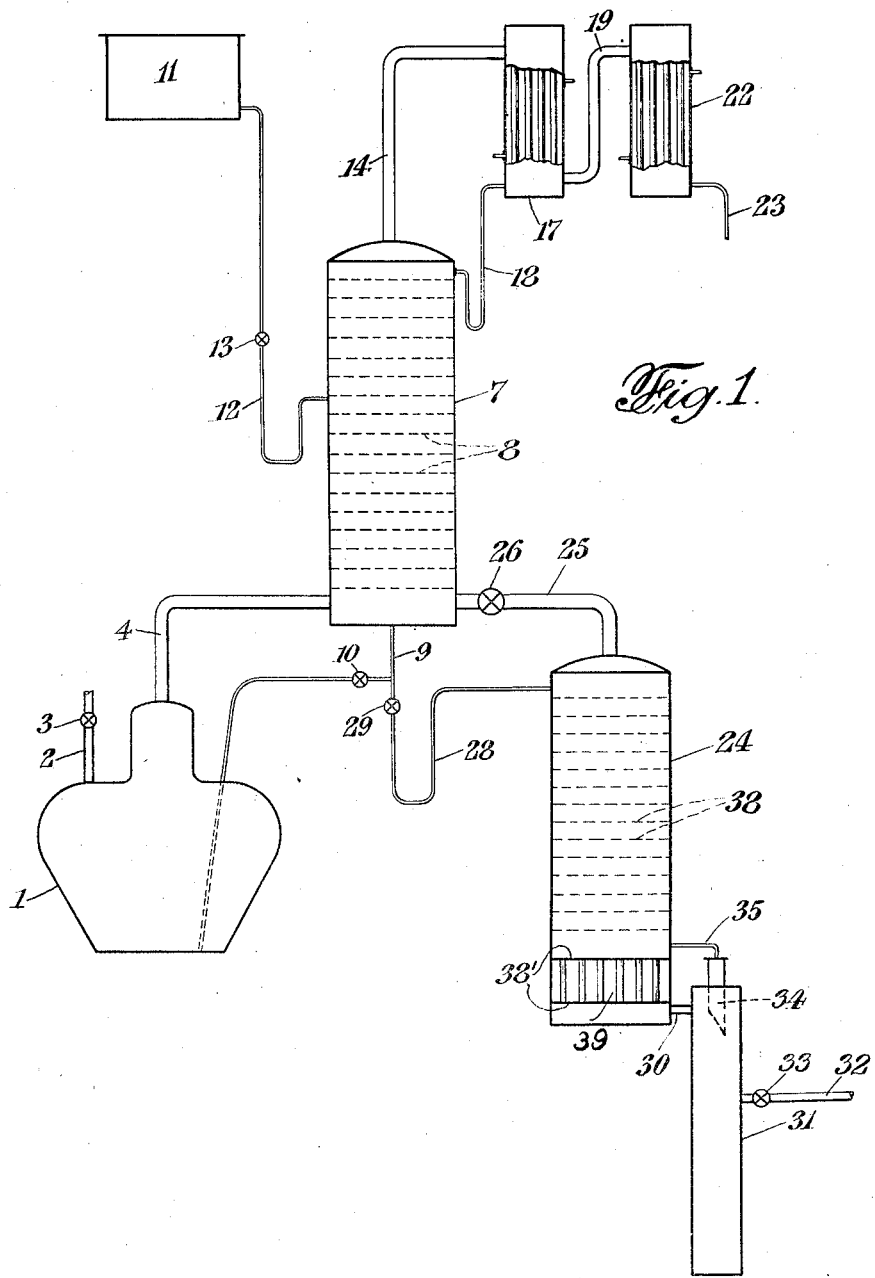

June 16, 1925.  1,542,538
H. F. WILLKIE
PROCESS OF PURIFYING ACETONE
Filed Nov. 4, 1921    2 Sheets-Sheet 2
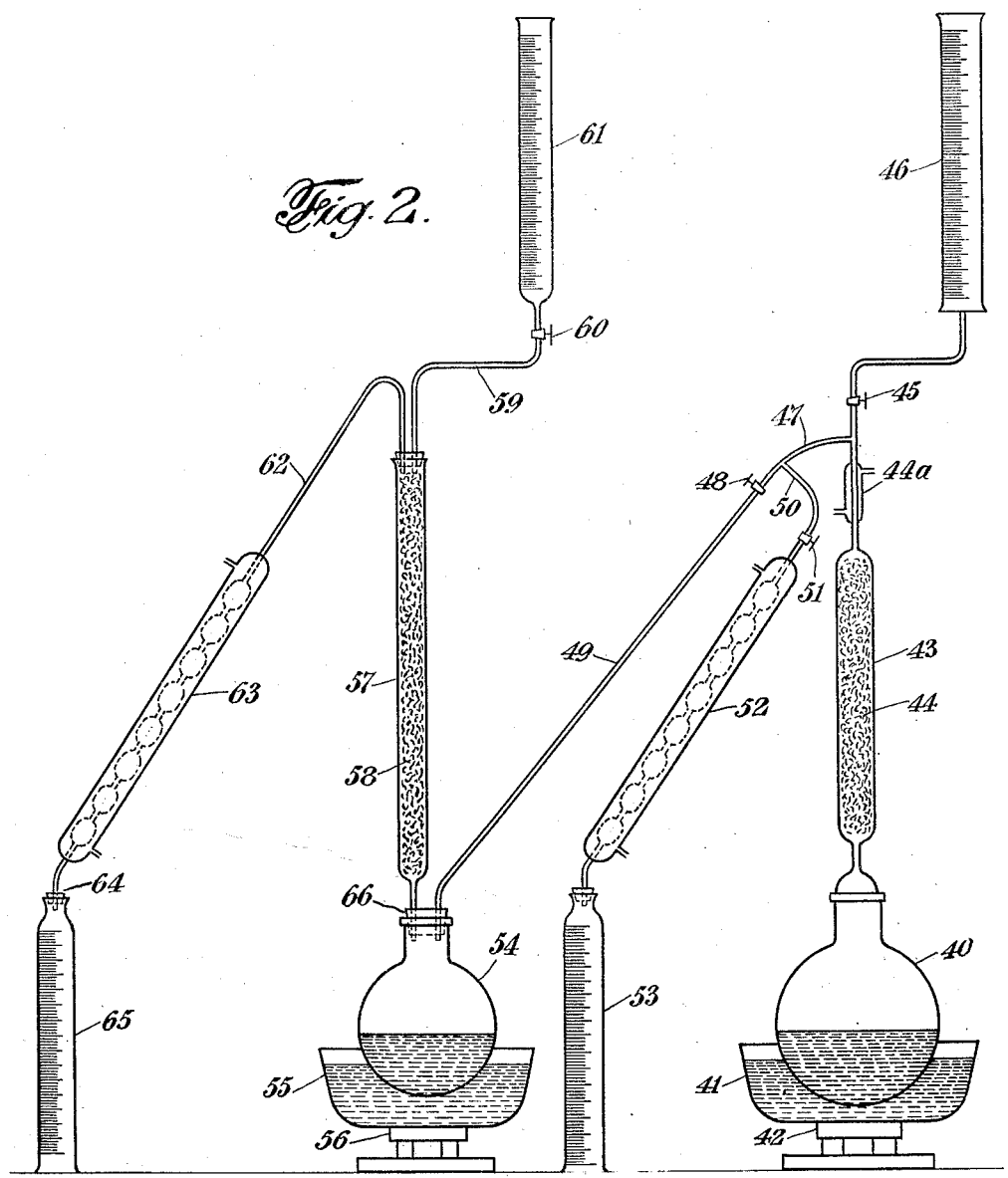

Patented June 16, 1925.

1,542,538

UNITED STATES PATENT OFFICE.

HERMAN F. WILLKIE, OF BALTIMORE, MARYLAND, ASSIGNOR TO U. S. INDUSTRIAL ALCOHOL CO., INC., A CORPORATION OF WEST VIRGINIA.

PROCESS OF PURIFYING ACETONE.

Application filed November 4, 1921. Serial No. 512,765.

*To all whom it may concern:*

Be it known that I, HERMAN F. WILLKIE, a citizen of the United States, a resident of Baltimore, State of Maryland, have invented a certain new and useful Process of Purifying Acetone, of which the following is a specification.

This invention relates to a process and apparatus for purifying acetone.

This invention has as an object the preparation of purified acetone from commercial grades and varieties of impure acetone, and the removal therefrom of suffocating and disagreeable odors and objectionable impurities such as organic bases and acetal. It has as a further object the provision of a process and apparatus for purifying acetone on a commercial scale in an efficient and economical manner.

Various types of apparatus may be employed in carrying out the process of the invention, but the following apparatus illustrates two preferred embodiments:—

Figure 1 shows an elevation more or less diagrammatic of an apparatus designed to purify acetone on a commercial scale.

Figure 2 illustrates an apparatus designed for the purification of acetone on a smaller or laboratory scale.

Considering first Fig. 1, there is shown a still 1 provided with inlet pipe 2 having a valve 3 and also provided with a vapor outlet pipe 4 for admitting the vapors to a washing column 7. The latter is provided with rectifying sections or plates 8 and has a return flow pipe 9 provided with a valve 10 leading back to the still 1. A permanganate container 11 is utilized to deliver permanganate solution to the column 7 through a pipe 12 provided with a valve 13. Leading from the column is a vapor pipe 14 leading to a dephlegmator 17 having a return pipe 18 leading back to the top of the column 7. A pipe 19 leads to a condenser 22, from which pipe 23 conducts condensed liquid to any suitable receiver.

An exhausting column 24 connects with the column 7 through a pipe 25 provided with a valve 26 and receives liquid from the column 7 through a pipe 28 provided with a valve 29. At the bottom of column 24 a pipe 30 conducts waste liquid into an overflow 31 operating at atmospheric pressure. A pipe 32 having a valve 33 connects to the overflow 31 and a vapor return pipe 34 connects to the bottom of the column through a smaller pipe 35.

Column 24 is provided with rectifying sections or plates 38 as in the case of the column 7 and there are two plates 38' at the bottom of the column between which there is a steam heating section 39.

Fig. 2 will now be described. There is shown a flask 40 positioned in a dish 41 containing a liquid bath heated by an electric hot plate 42 and a vertical rectifier 43, containing fragments of a suitable inert material 44 and carrying at its upper end a reflux condenser 44ª, is fitted into the top of the flask for rectifying vapors evolved from the flask. A graduated vessel 46 supplies the column 43 with liquid which is regulated by a stop cock 45. A tube 47 provided with a valve 48 leads through an inclined tube 49 into a second flask 54, there being a by-pass 50 provided with valve 51 leading into condenser 52 provided with receiver 53. The flask 54 is heated by a liquid bath 55 on a hot plate 56. A rectifying column 57 provided with fragments of inert material 58 is inserted in the top of the flask 54 and a vessel 61 feeds liquid to said column through a pipe 59 provided with valve 60. From the column a tube 62 leads downwardly to a condenser 63 connected through a cork 64 to a receiver 65. The cork or stopper 64 may be of any suitable material such as cork or rubber, covered if desired with tin foil, and similar stoppers may be provided for the flask 54 such as a stopper 66.

In the operation of the apparatus of Fig. 1, impure or commercial acetone is placed in the still 1 together with an equal volume of dilute sulphuric acid containing 1 part concentrated sulphuric acid in 10 volumes of the dilute acid. The still is heated by any suitable source of heat (not shown) and the vapors pass upwardly through the pipe 4 into the column 7, the valve 10 being open and the valves 26 and 29 being closed. The distillation is continued until the first impure or bad-smelling fraction has been removed, the washing column, dephlegmator and condenser serving as a rectifying apparatus. After this fraction, which may run as high as 20 to 25% has been removed, the valve 10 is closed and the valves 26 and 29 are opened while permanganate solution is allowed to issue from the tank 11 into the column 7. As the permanganate works its way down over the plates of the column, it removes objectionable impurities from the acetone and both the acetone and permanganate travel down through the pipes 9 and 28 into the exhausting column 24 heated by the steam pipes 39 and the acetone is distilled off from the permanganate solution and passes up through the pipe 25 into column 7 again and upwardly through the pipe 14 to the condensing apparatus, whence it issues in a pure condition through the pipe 23. After about 60% of the acetone has been recovered in this manner, the exhausting column 24 is again shut off by closing the valves 26 and 29, the valve 10 is opened, the valve 13 is closed, and the last impure portion of the acetone comprising about 15% of the original amount is distilled off by the column 7 and collected through the pipe 23 separately. There is thus recovered in a pure condition about 60% of the original acetone in the still 1. The impure acetone obtained may be used for any purpose for which such a product is adapted. The reduced permanganate liquid is removed through the pipe 30 into the overflow apparatus.

The operation of the apparatus of Fig. 2 will now be described. The impure acetone is mixed with an equal volume of dilute sulphuric acid containing one volume of concentrated acid in 5 volumes of the diluted liquid so as to treat the acetone in the form of a liquid, and distilled so that the vapors pass upwardly through the column 43. The acid may be introduced from the vessel 46 to treat the acetone in the form of a vapor, but the use of the vessel 46 is optional. The first impure fraction is removed through the pipe 50, the valve 48 being closed, and condensed in the condenser 53, the liquid being received in the receiver 53. After this impure first fraction has passed over, the valve 51 is closed, the valve 48 opened, and the vapors then proceed through the pipe 49 into the flask 54, which is maintained hot enough to prevent condensation of the acetone, whence they pass up through the column 57 and are therein subjected to an alkaline solution of potassium permanganate containing .04% $KMnO_4$ and .3 grams NaOH per hundred c. c. This permanganate solution removes many oxidizable impurities from the vapors and the purified acetone vapor issues through the pipe 62 into the condenser 63 and is collected in the receiver 65. The flask 54 serves to catch impurities heavier than acetone and the liquid in the flask 54 is kept at a temperature slightly higher than the boiling point of pure acetone.

While two preferred embodiments of the invention have been set forth in detail, many variations are possible. The strength of the acid may vary considerably, but in large scale operations such as in Fig. 1 it is best to use dilute acid such as one part in 10, whereas in small scale operations like that of Fig. 2 a more concentrated acid may be used such as one part in 4. When working on a large scale, a mixture of equal parts of acetone and dilute acid containing 1 part concentrated acid in 10 parts of aqueous liquid has been found very efficient for it avoids condensation of the acetone. When working on a smaller scale, it has been found advantageous to use 1 part of dilute acid to from 1 to 4 parts of acetone, the acid concentration being in such a case 1 part concentrated sulphuric acid mixed with 4 parts of water. In suitable cases one can use dilute acid containing only 1 part acid in 20 parts of aqueous liquid. The concentrations of the permanganate solution may likewise vary over a wide range and the solution may be alkaline or neutral. Advantageous results are secured by using one volume of permanganate solution to one volume of acetone, the permanganate concentration ranging from .02% to .05% while the sodium hydroxide concentration may range from .02% to .05%. As before stated, the alkali may be omitted. Higher concentrations may be used and even saturated solutions of permanganate and alkali may be effectively employed. Permanganates of other materials such as sodium or calcium may be substituted for the potassium permanganate.

The acetone resulting from the above described processes is very pure showing upon analysis as high as 99½% acetone, which is fully as pure as acetone prepared by the bisulphite method and is obtained at much less expense. The first and last impure fractions of acetone described are still commercially valuable since they may be used in processes where the impurities are not particularly detrimental. The acetone as thus purified has no objectionable odors and is free of organic bases and acetal together with other impurities. The amounts of impure acetone removed at the beginning and end of the distillation can of course be varied to suit the requirements for the grade of acetone ultimately desired, and the proportions of 20 to 25% and 15% respectively, given in the preferred embodiments, illustrate what proportions may be removed to secure chemically pure acetone. Of course these impure fractions may be purified by the process of this invention, if such a course can be economically carried out. Other non-volatile acids suitable for removing organic bases and other impurities may be used in place of sulphuric acid such as phosphoric acid, oxalic acid, tartaric acid.

Other suitable oxidizing agents besides permanganates may be used such as chromates and peroxides.

As many apparently widely different embodiments of the invention may be made without departing from the spirit thereof, it is to be understood that I do not intend to limit myself to the specific embodiment thereof except as indicated in the appended claims.

I claim:

1. The process of purifying acetone comprising forming a mixture of equal parts acetone and sulphuric acid diluted in the proportions of about 1 to 10, distilling off the acetone, and treating it with alkaline permanganate solution to oxidize the impurities.

2. The process of purifying acetone comprising treating it with an acid, distilling and collecting the first and last portions of the distillate containing impurities, and treating the middle portion of the distilled acetone with an oxidizing agent.

3. The process of purifying acetone comprising treating it with sulphuric acid, distilling and collecting the first and last portions of the distillate containing impurities, and treating the middle portion of the distilled acetone with alkaline permanganate solution.

4. The process of purifying acetone comprising treating it with an acid, distilling and collecting the first and last portions of the distillate containing impurities, treating the greater portion of the distilled acetone with an oxidizing agent, distilling acetone from the latter, and collecting the pure acetone.

5. The process of purifying acetone comprising treating it with dilute sulphuric acid, distilling and collecting the first and last portions of the distillate containing impurities, treating the middle portion of the distilled acetone with dilute alkaline permanganate solution, and separating the acetone from the latter by distillation.

6. The process of purifying acetone comprising distilling it from a mixture with an acid, and passing a portion of the vapors evolved through an oxidizing agent.

7. The process of purifying acetone comprising distilling it from a mixture with an acid, separately collecting the first and last impure portions, and treating the middle portion of the vapors evolved with an oxidizing agent while said middle portion is in vapor form.

8. The process of purifying acetone comprising treating it with an acid, distilling off the first portion and collecting it separately, and treating the succeeding portion in the vapor phase with an oxidizing agent.

9. The process of purifying acetone comprising treating it with an acid, distilling off the first portion and collecting it separately, treating the succeeding portion in the vapor phase with an oxidizing agent, and distilling and collecting the last portion of the acetone.

10. The process of purifying acetone comprising distilling it from a mixture with an acid, separately collecting the first portion of the distillate, passing the succeeding portion through an oxidizing agent, and separately collecting the last portion.

11. The process of purifying acetone comprising distilling it from an equal volume of dilute sulphuric acid, separately collecting the first and last portions, and passing the middle portion through an equal volume of dilute alkaline permanganate solution.

In testimony that I claim the foregoing, I have hereunto set my hand this 28 day of October, 1921.

HERMAN F. WILLKIE.